United States Patent [19]

Husted

[11] 4,109,739
[45] Aug. 29, 1978

[54] POWER DRIVEN SKI-BOB
[75] Inventor: Royce Hill Husted, Wheaton, Ill.
[73] Assignee: Saroy Engineering, Wheaton, Ill.
[21] Appl. No.: 757,457
[22] Filed: Jan. 6, 1977
[51] Int. Cl.² .......................................... B62M 27/00
[52] U.S. Cl. ..................................... 180/5 R; 280/28
[58] Field of Search .............................. 180/5 R, 5 A; 280/103 RF

[56] References Cited
U.S. PATENT DOCUMENTS

| | | | |
|---|---|---|---|
| 2,051,496 | 8/1936 | Sarrazin | 180/5 A |
| 2,423,544 | 7/1947 | Acton | 180/5 A |
| 3,853,192 | 12/1974 | Husted | 180/5 R |
| 3,856,318 | 12/1974 | Hollenbeck | 180/5 R |

FOREIGN PATENT DOCUMENTS 2,003,326   8/1971   Fed. Rep. of Germany.

*Primary Examiner*—Philip Goodman
*Attorney, Agent, or Firm*—Samuel Shiber

[57] ABSTRACT

A power driven ski-bob having a frame supported by a front steerable ski and a rear power driven ski sub-assembly, the rear end of which is forceably biased downwards to improve traction and steerability.

1 Claim, 3 Drawing Figures

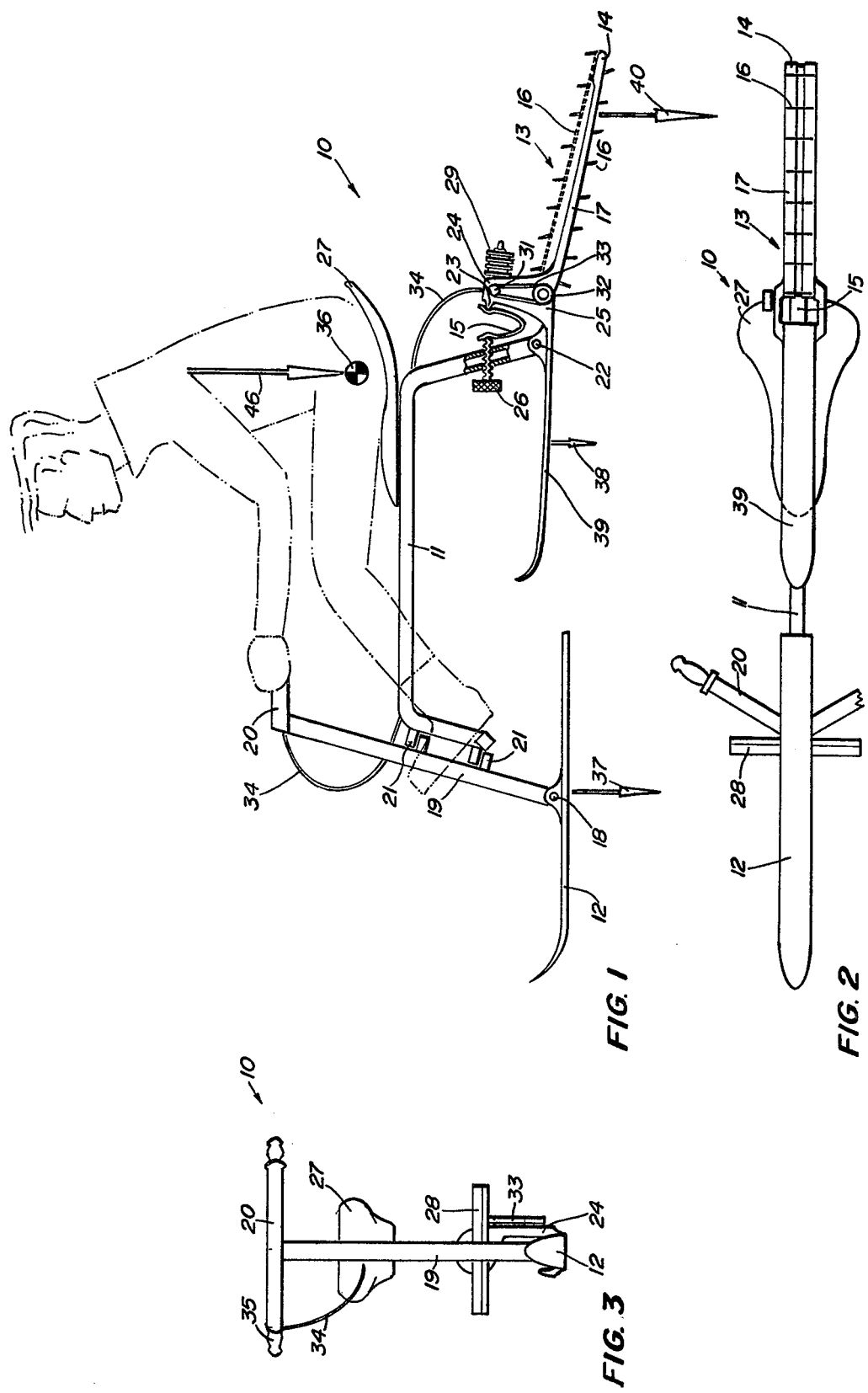

POWER DRIVEN SKI-BOB

BACKGROUND OF THE INVENTION

A power driven ski-bob which is propelled by a power driven ski is a newcomer to the field of winter recreation.

Presently there is a polarization between outdoor winter sports enthusiasts. The purist adhere to skis propelled by gravity or skier's muscles, while the modernists enjoy mounting a snowmobile which employs brute force to propell itself and its riders. Power driven skis (shown in U.S. Pat. Nos. 3,853,192 and 3,966,010 which are herein incorporated by reference), and the present invention bridge this gap between the purists and the modernists. They do so by combining the excitement of using one's sense of balance to control and steer with the excitement of controlling one's propelling power, and they remove or reduce the objectionable aspects of snowmobiling. For example, the total weight of a current power driven ski-bob is around 30 pounds and it is propelled by a 3½ HP engine, versus several hundred pounds that the average snowmobile weighs, which are pushed by approximately a 10 times larger engine. In contrast to snowmobiles, ski-bobs have a minimal effect on the trail they pass, they do not develop large kinetic energy that may endanger their rider and others and they are not likely to get stuck in the snow, since the average rider can lift the unit in one hand. The small engine generates less acustical energy which can be readily muffled to non-obtrusive levels. Further, power driven ski-bobs are characterized by their long and narrow footprints, and have no stability of their own. Thus, the rider has, like on a bicycle, to continuously generate centrifugal balancing forces, which makes riding a power driven ski-bob an involving and exciting experience. As will be explained later on, this characteristic of power driven ski-bob is closely related to the present invention.

SUMMARY OF THE INVENTION

Briefly, a power driven ski-bob is produced by forming a frame the front end of which is connected to a steerable ski and its rear end to a power driven ski. The rear end of the power driven ski is biased downwards by resilient means to improve traction and steerability. In view of the previous discussion it can be understood that responsive steering in power driven ski bob type of device, is essential, because the rider's ability to maintain his precious balance relies on an accurate and predictable steering response. Thus, as will be explained later on, the resilient means simultaneously improve traction and improve steerability while at the same time assist the rider in overcoming the adverse effects of hitting a bump or taking a sharp turn.

BRIEF DESCRIPTION OF THE FIGURES

FIG. 1, 2 and 3 show a side, bottom and front view of a power driven ski-bob, respectively.

DETAILED DESCRIPTION OF THE FIGURES

FIGS. 1, 2 and 3 show a power driven ski-bob 10 having a frame 11 supported by a front steerable ski 12 and a rear power driven ski sub-assembly 13, whose rear end 14 is forcibly biased downwards by resilient means in the form of a bent leaf spring 15. This bias achieves three of the objects of the present invention: it improves traction, since it energizes the tread 16 and the posterior portion 17 of the power driven ski against the snow, and it improves steerability and controllability by shifting some of the skier's weight to the front ski 12. The nature and effect of this weight shift will be further discussed in the next paragraph, and at this point the rest of the power driven ski-bob hardware will be briefly reviewed: the front ski 12 is pivotly connected through a pin 18 to steering shaft 19 which carries a handlebar 20 and which is connected to the frame 11 through two hinges 21. The power driven ski 13 is slightly modified to be pivotly connected to the frame through a pin (instead of the boot binding shown in U.S. Pat. Nos. 3,853,192 and 3,966,010) and it is also equipped with a rounded stud 23 protruding from an engine bracket 24 which forms part of a body 25 of the power driven ski 13. The leaf spring 15 is bent and squeezed between the stud 23 and a rounded screw 26 which is threaded through frame 11 and serves to adjust the force biasing the rear end 14 downwards. A seat 27, and a feet-bar 28 are affixed to the frame 11. The detailed structure of the power driven ski 13 can be found in U.S. Pat. Nos. 3,853,192 and 3,966,010, therefore only its major components are illustrated, and they are an engine 29 coupled to the tread 16 through pullies 31 and 32 and belt 33. A jacketed cable 34 which is connected to a handle 35 regulates the engine's power output.

At this point I would like to go back and review the effects of the spring 15, and to start the discussion it will be assumed that: the weight of the skier (who is shown in phantom lines on FIG. 1) and the power driven ski-bob 10 is represented by a sign 36 and an arrow 46, an arrow 37 represents a portion of the weight which is supported through the front ski 12, while an arrow 38 represents a weight portion which is supported through the anterior portion 39 of the power drive ski and an arrow 40 represents the weight portion supported by its posterior portion 17. It can be seen that as screw 26 is screwed inwards it forces both the rear end 14 and the front steering ski 12 downwards energizing them against the snow. It does so by shifting part (or all) of the weight portion 38 which was supported by the anterior ski portion 39, since it is obvious that statically the sum of weight portions 37, 38 and 40 has to equal the total weight represented by the arrow 46. The increased weight on the front steering ski 12 improves the steerability of the power driven ski-bob while the additional weight on the posterior power driven ski portion 17 improves the traction generated by the tread 16. Now it is possible to increase the weight portion 37 on the front ski by moving the seat forward on the frame 11. This, however, will decrease the weight portion 40, reducing the traction obtained by the tread 16, and in addition it will have adverse effects when the power driven ski-bob encounters a bump or when the rider takes a sharp turn. The reason for this adverse effect is that when the skier's weight increases suddenly due to an upwards or centrifugal acceleration, such increased weight should ideally be absorbed through the power driven ski 13 which cannot rotate due to such jolts under the skier, whereas the front steering ski 12 can, and this tends to cause the rider a loss of balance. In contrast, when the bulk of the weight 46 is over the power driven ski 13, divided into portions 38 and 40, and then part of the weight portion 38 is shifted to rear end 14 and to the front ski 12, any jolt due to vertical and centrifugal accelerations is absorbed by the long non-rotating power driven ski 13 with minimal adverse effect on the rider's balance while at the same time steerability and traction are maximized simultaneously.

The amount of weight shifted from the anterior portion 39 to the posterior portion 17 and to the front ski 12 is regulated by the screw 26 according to the rider's (or riders') weight and according to the type and depth of snow.

I claim:

1. A power driven ski-bob having a frame supported by a front steerable ski and a rear power driven ski sub-assembly, said sub-assembly having an anterior ski portion and a posterior tread carrying portion and being pivoted to the frame, the improvement wherein spring means, supported between said frame and said sub-assembly, are located and arranged so as to forcibly bias said posterior portion downwards and said anterior portion upwards in order to improve traction and bias load to the front steerable ski, thereby also improving steerability of said ski-bob.

* * * * *